(12) United States Patent
Choi et al.

(10) Patent No.: US 9,071,702 B2
(45) Date of Patent: Jun. 30, 2015

(54) MOBILE TERMINAL AND METHOD FOR CONTROLLING THE MOBILE TERMINAL

(75) Inventors: Hyeonchang Choi, Gyeonggi-Do (KR); Jaeyoung Choi, Seoul (KR); Changhoon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 654 days.

(21) Appl. No.: 13/332,289

(22) Filed: Dec. 20, 2011

(65) Prior Publication Data

US 2012/0164971 A1    Jun. 28, 2012

(30) Foreign Application Priority Data

Dec. 22, 2010    (KR) .................. 10-2010-0132786

(51) Int. Cl.
*H04W 88/02*    (2009.01)
*H04M 1/725*    (2006.01)
*G06F 3/0482*    (2013.01)
*G06F 9/445*    (2006.01)

(52) U.S. Cl.
CPC ...... *H04M 1/72572* (2013.01); *H04M 1/72566* (2013.01); *H04M 2250/12* (2013.01); *H04M 2250/22* (2013.01); *G06F 3/0482* (2013.01); *G06F 9/445* (2013.01); *G06F 9/44505* (2013.01)

(58) Field of Classification Search
USPC ..................... 455/405, 412.1, 412.2, 419, 573
See application file for complete search history.

(56) References Cited

U.S. PATENT DOCUMENTS

2008/0293375 A1* 11/2008 Swanburg ............... 455/405
2012/0052817 A1*  3/2012 Lee et al. ................. 455/68

* cited by examiner

*Primary Examiner* — Sam Bhattacharya
(74) *Attorney, Agent, or Firm* — Lee, Hong, Degerman, Kang & Waimey

(57) ABSTRACT

A mobile terminal includes a memory configured to store a prior usage pattern of at least one application, the prior usage pattern being used to control when the at least one application is executed. The controller further includes a controller configured to apply at least one setting related to execution of the at least one application in accordance with the prior usage pattern or provide a menu for applying the at least one setting related to execution of the at least one application in accordance with the prior usage pattern and execute the at least one application after the at least one setting is applied.

15 Claims, 12 Drawing Sheets

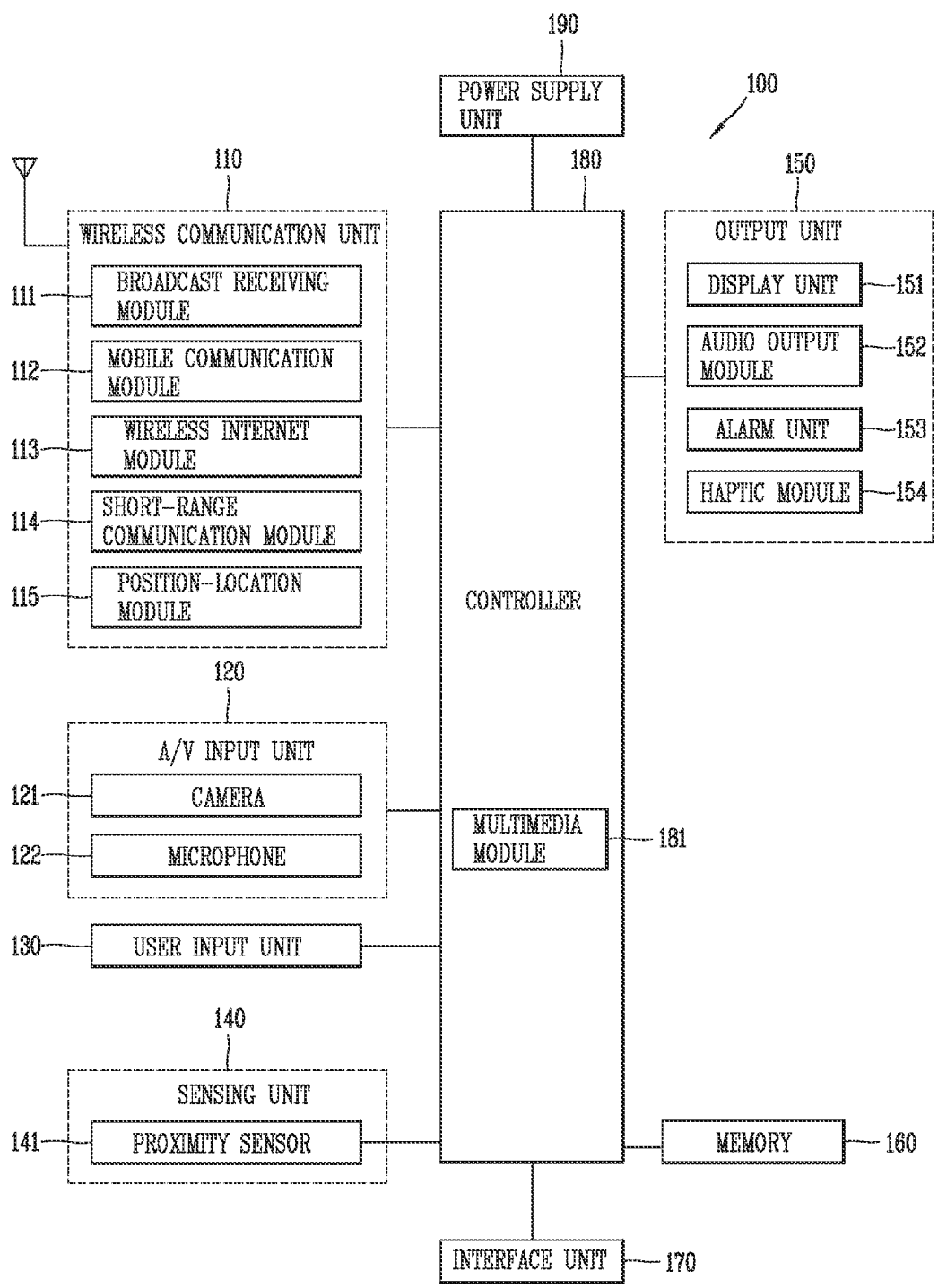

MOBILE TERMINAL AND METHOD FOR CONTROLLING THE MOBILE TERMINAL

CROSS-REFERENCE TO RELATED APPLICATIONS

Pursuant to 35 U.S.C. §119(a), this application claims the benefit of earlier filing date and right of priority to Korean Patent Application No. 10-2010-0132786, filed on Dec. 22, 2010, the contents of which are hereby incorporated by reference herein in their entirety.

FIELD OF THE INVENTION

The present invention relates to a mobile terminal, and more particularly, to a mobile terminal and a method for controlling the mobile terminal.

DESCRIPTION OF THE RELATED ART

Generally, terminals can be classified into mobile or portable terminals and stationary terminals. Furthermore, the mobile terminals can be classified as handheld terminals and vehicle mount terminals according to whether users can carry the terminals on their person.

As the functions of such terminals are diversified, the demand for greater convenience from the user interfaces of such terminals continues to increase According to an embodiment, a mobile terminal includes a memory configured to store a prior usage pattern of at least one application, the prior usage pattern being used to control when the at least one application is executed. The mobile terminal further includes a controller configured to apply at least one setting related to execution of the at least one application in accordance with the prior usage pattern or provide a menu for applying the at least one setting related to execution of the at least one application in accordance with the prior usage pattern and execute the at least one application after the at least one setting is applied.

According to another embodiment, a method for controlling a mobile terminal includes collecting status information of the mobile terminal when an application is executed and generating a prior usage pattern of at least one application based on the collected status information, the prior usage pattern being used to control when the at least one application is executed. The method further includes applying at least one setting related to execution of the at least one application according to the prior usage pattern, or providing a menu used for applying the at least one setting according to the prior usage pattern and executing the at least one application after the at least one setting is applied.

According to another embodiment, a mobile terminal includes a touch screen configured to display information and receive a user input and a memory configured to store a prior usage pattern of at least one application, the prior usage pattern being used to control when the at least one application is executed. The mobile terminal further includes a controller configured to identify an application of the at least one application that is frequently executed at a preferred time according to the prior usage pattern, apply at least one setting related to execution of the application before the preferred time or provide a menu for applying the at least one setting before the preferred time, receive content related to the application or provide a menu for receiving the content before the preferred time, and execute the application at the preferred time.

According to another embodiment, a mobile terminal includes a touch screen configured to display information and receive a user input and a memory configured to store a prior usage pattern of at least one application, the prior usage pattern being used to control when the at least one application is executed. The mobile terminal further includes a controller configured to control the touch screen to display at least one icon for executing the at least one application, where one or more of the least one icon are distinguished for a period of time according to the prior usage pattern.

According to another embodiment, a mobile terminal includes a touch screen configured to display information and receive a user input and a memory configured to store a prior usage pattern of at least one application, the prior usage pattern being used to control when the at least one application is executed. The mobile terminal further includes a controller configured to identify a means by which the mobile terminal is moving, identify an application of the at least one application corresponding to the means by which the mobile terminal is moving by using the prior usage pattern, apply a setting related to the execution of the application, and execute the application after the setting is applied.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. The aspects, features, and advantages of the present invention will become more apparent upon consideration of the following description of preferred embodiments, taken in conjunction with the accompanying drawing figures. In the drawings:

FIG. 1 illustrates a block diagram of a mobile terminal in accordance with one embodiment of the present invention.

DETAILED DESCRIPTION

Figure 2A:
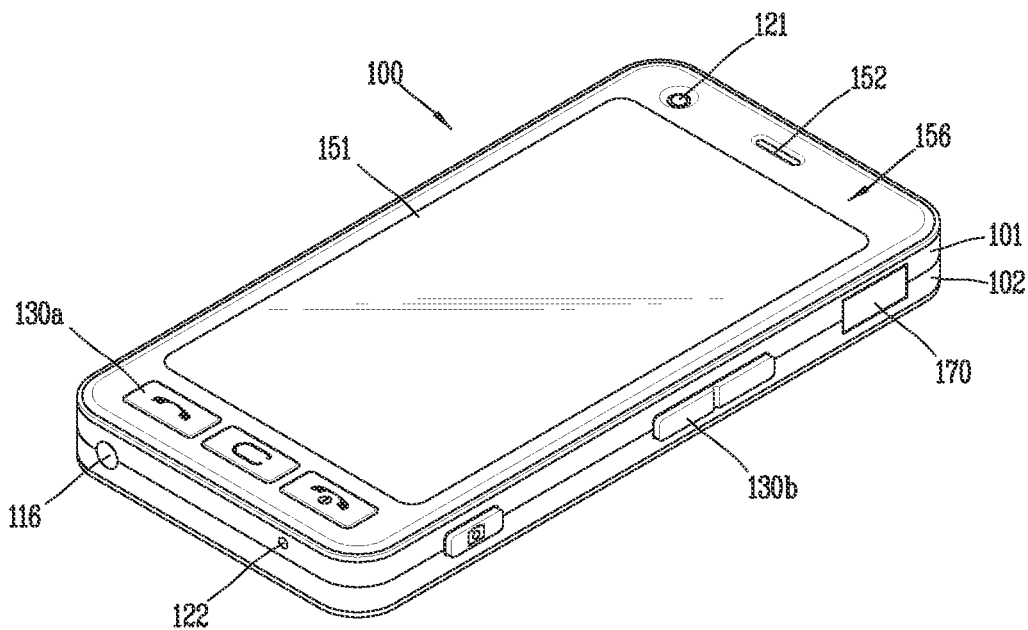
FIG. 2A is a front perspective view of a mobile terminal in accordance with one embodiment of the present invention.

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

The terms "module," "unit," and "part" are used herein with respect to various elements only to facilitate disclosure of the invention. Therefore, the terms "module," "unit," and "part" are used interchangeably herein.

The present invention can be applied to various types of terminals. For example, the terminals can include mobile terminals as well as stationary terminals, such as mobile phones, smart phones, digital broadcast receivers, digital televisions (DTVs), computers, personal digital assistants, portable multimedia players (PMPs) and navigation devices.

For ease of description, the various embodiments will be described with respect to a mobile terminal 100 shown in FIGS. 1 through 3. However, it should be understood that such techniques can also be applied to other types of terminals.

FIG. 1 illustrates a block diagram of the mobile terminal 100 in accordance with one embodiment of the present invention. As shown in FIG. 1, the mobile terminal 100 includes a wireless communication unit 110, an audio/video (AV) input unit 120, a user input unit 130, a sensing unit 140, an output unit 150, a memory 160, an interface unit 170, a controller 180, and a power supply unit 190. It should be understood that the mobile terminal 100 may include additional or fewer components than those shown in FIG. 1.

The wireless communication unit 110 can include one or more components for allowing wireless communication between the mobile terminal 100 and a wireless communication system or network within which the mobile terminal 100 is located. For example, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast related information from an external broadcast management server or other network entity via a broadcast channel.

The broadcast channel can include a satellite channel and a terrestrial channel. The broadcast management server can be a server that generates and transmits a broadcast signal and/or broadcast related information, or a server that receives a previously-generated broadcasting signal and/or previously-generated broadcasting-related information and transmits the previously-generated broadcast signal and/or previously-generated broadcasting-related information to the mobile terminal 100.

For example, the broadcast signal can be implemented as a TV broadcast signal, a radio broadcast signal, a data broadcast signal, and various other types of signals. In one embodiment, the broadcast signal can include a combination of the broadcast signal and a TV broadcast signal or a combination of the broadcast signal and a radio broadcast signal.

The broadcast-related information can be provided to the mobile terminal 100 through a mobile communication network. In such a case, the broadcast-related information can be received by the mobile communication module 112.

The broadcast-related information can be implemented in various forms. For example, the broadcast-related information can include an electronic program guide (EPG) of the digital multimedia broadcasting (DMB) standard, or an electronic service guide (ESG) of the digital video broadcast-handheld (DVB-H) standard.

The broadcast receiving module 111 can be configured to receive broadcast signals transmitted from various types of broadcast systems, such as digital multimedia broadcasting-terrestrial (DMB-T), digital multimedia broadcasting-satellite (DMB-S), DVB-H, the data broadcasting system known as media forward link only (MediaFLO®) and integrated services digital broadcast-terrestrial (ISDB-T) systems. The broadcast receiving module 111 can be configured to receive signals from broadcasting systems providing broadcasting signals other than the previously described digital broadcasting systems. The broadcast signal and/or broadcast-related information received via the broadcast receiving module 111 can be stored in a storage medium, such as the memory 160.

The mobile communication module 112 can transmit and/or receive wireless signals to and/or from at least one network entity, such as a base station (e.g., access point or Node B), an external terminal, or a server. For example, such wireless signals can include a voice call signal, a video call signal, or data according to a transmission and reception of text/multimedia messages.

The wireless Internet module 113 can be a module that supports Internet access for the mobile terminal 100. The wireless Internet module 113 can be included in the mobile terminal 100 or installed in an external device that is coupled to the mobile terminal 100. For example, the wireless Internet technology implemented by the wireless Internet module 113 can be a wireless local area network (WLAN), Wi-Fi®, Wireless Broadband (WiBro®), World Interoperability for Microwave Access (WiMAX®), or High Speed Downlink Packet Access (HSDPA).

The short-range communication module 114 can be a module for supporting relatively short-range communications. For example, the short-range communication module 114 can be configured to communicate using short-range communication technology, such as radio frequency identification (RFID), Infrared Data Association (IrDA), or Ultra-wideband (UWB), as well as networking technologies, such as Bluetooth® or ZigBee®.

The position-location module 115 identifies or otherwise obtains the location or position of the mobile terminal 100. In one embodiment, the position-location module 115 can include a global positioning system (GPS) module.

The A/V input unit 120 can be used to input an audio signal or a video signal, and can include a camera 121 and a microphone 122. For example, the camera 121 can receive and process image frames of still images or video obtained by an image sensor of the camera 121 in a video capturing mode or an image capturing mode. The processed image frames can be displayed on a display unit 151.

The image frames processed by the camera 121 can be stored in the memory 160 or can be transmitted to an external device via the wireless communication unit 110. Other embodiments of the mobile terminal 100 can include more than one camera 121.

The microphone 122 can receive audible sounds while the mobile terminal 100 is operating in a particular mode, such as a phone call mode, a recording mode or a voice recognition mode, and can process the audible sounds into electrical audio data. The audio data can then be converted into a form that can be transmitted to a mobile communication base station or other network entity through the mobile communication module 112 in the call mode. The microphone 122 can apply various noise removal or noise canceling algorithms for removing or reducing noise generated when audio signals are received.

The user input unit 130 can generate input data from commands entered by a user to control various operations of the mobile terminal 100. The user input unit 130 can include a keypad, a dome switch, a touchpad, a jog wheel, or a jog switch. In one embodiment, the touchpad can be configured to detect changes in resistance, pressure, or capacitance as a result of contact.

The sensing unit 140 can sense a location of the mobile terminal 100, whether a user touches the mobile terminal 100, an orientation of the mobile terminal 100, acceleration or deceleration of the mobile terminal 100, direction of movement of the mobile terminal 100, and a current state of the mobile terminal 100, such as an open or close state. The sensing unit 140 can also include a proximity sensor 141.

The sensing unit 140 can generate signals or commands for controlling the operation of the mobile terminal 100. For example, when the mobile terminal 100 is implemented as a slide type phone, the sensing unit 140 can sense whether the mobile terminal 100 is opened or closed. Furthermore, the sensing unit 140 can sense whether the power supply unit 190 supplies power and whether the interface unit 170 is connected to an external device.

The output unit 150 can generate visual, auditory and/or tactile outputs, such as an audio signal, a video signal, an alarm signal, or a vibration signal. The output unit 150 can include the display unit 151, an audio output module 152, an alarm unit 153, and a haptic module 154. The display unit 151 can be configured to display information processed in the mobile terminal 100.

For example, when the mobile terminal 100 is in a phone call mode, the display unit 151 can display a User Interface (UI) or a Graphic User Interface (GUI) associated with a call or other communication, such as text messaging or multimedia file downloading. When the mobile terminal 100 is in a video call mode or image capturing mode, the display unit 151 can display a captured image and/or a received image, a UI or GUI that shows videos or images and functions related thereto.

The display unit 151 can include a liquid crystal display (LCD), a thin film transistor-liquid crystal display (TFT-LCD), an organic light-emitting diode display (OLED), a flexible display and a three-dimensional display. The mobile terminal 100 can be configured to include more than one display unit 151.

For example, the mobile terminal 100 can include a number of display units 151 that are arranged on a single face of the mobile terminal 100, and can be spaced apart from one another or integrated in one body. The number of display units 151 can also be arranged on different sides of the mobile terminal 100.

In one embodiment, the display used in the display unit 151 can be a transparent type, such that the display unit 151 is implemented as a transparent display. For example, the transparent display can include a transparent OLED (TOLED) display. The rear structure of the display unit 151 can be a light-transmissive structure. Accordingly, a user may see an object located behind the body of the mobile terminal 100 through the transparent area of the body of the mobile terminal 100 that is occupied by the display unit 151.

When the display unit 151 and a sensor for sensing a user touch (hereinafter referred to as a "touch sensor") are configured as a layered structure to form a touch screen, the display unit 151 can be used as an input device in addition to an output device. For example, the touch sensor can be in the form of a touch film, a touch sheet, or a touch pad.

The touch sensor can convert a variation in pressure applied to a specific portion of the display unit 151 or a variation in capacitance generated at a specific portion of the display unit 151 into an electric input signal. The touch sensor can sense pressure resulting from a touch, as well as the position and area of the touch.

When the user applies a touch input to the touch sensor, a signal corresponding to the touch input can be transmitted to a touch controller (not shown). The touch controller can process the signal and transmit data corresponding to the processed signal to the controller 180. The controller 180 can then use the data to identify a touched portion of the display unit 151.

The proximity sensor 141 of the sensing unit 140 can be located in an internal region of the mobile terminal 100 and either be enclosed by the touch screen or near the touch screen. The proximity sensor 141 can sense the presence or absence of an object that accesses a certain detect surface or an object that exists nearby without any physical contact using an electromagnetic field or infrared rays. The longevity of the proximity sensor 141 can substantially exceed the longevity of a contact sensor, and the proximity sensor 141 can have greater utility than a contact sensor.

The proximity sensor 141 can include a transmission type photo sensor, a direct reflection type photo sensor, a mirror-reflection type photo sensor, a radio frequency oscillation proximity sensor, a capacitance type proximity sensor, a magnetic proximity sensor, and/or an infrared proximity sensor. In one embodiment, the touch screen can be an electrostatic type touch screen, such that an approach of a pointer can be detected through a variation in an electric field according to the approach of the pointer. Accordingly, the touch screen or touch sensor can be classified as the proximity sensor 141.

For purposes of clarity, an action of the pointer approaching the touch screen and being recognized without actually contacting the touch screen will also be herein referred to as a "proximity touch," while an action of bringing the pointer into contact with the touch screen will also be herein referred to as a "contact touch." A proximity touch position of the pointer on the touch screen can correspond to a position on the touch screen from which the pointer is situated perpendicularly with respect to the touch screen.

A proximity touch and a proximity touch pattern can be detected via the proximity sensor 141, such as a proximity touch distance, a proximity touch speed, a proximity touch time, a proximity touch position, or a proximity touch movement state. For example, information corresponding to the detected proximity touch action and proximity touch pattern can be displayed on the touch screen.

The audio output module 152 can output audio data received from the wireless communication unit 110, or stored in the memory 160, in a call receiving mode, a call placing mode, a recording mode, a voice recognition mode, or a broadcast receiving mode. The audio output module 152 can also provide audio signals related to particular functions performed by the mobile terminal 100, such as a call signal received sound or a message received sound. For example, the audio output module 152 can include a speaker, a buzzer, or other audio output device.

The alarm unit 153 can output a signal for indicating the occurrence of an event of the mobile terminal 100. Events generated in the mobile terminal 100 can include a call signal reception, a message signal reception, key signal inputs, and a touch input. In addition to video or audio signals, the alarm unit 153 can output signals in a different manner to inform about an occurrence of an event. The video or audio signals can also be output via the display unit 151 or the audio output module 152. Therefore, in various embodiments, the display unit 151 or the audio output module 152 can be considered part of the alarm unit 153.

The haptic module 154 can generate various tactile effects that can be physically sensed by the user. For example, a tactile effect generated by the haptic module 154 can include vibration. The intensity and/or pattern of the vibration generated by the haptic module 154 can be controlled. For example, different vibrations can be combined and provided or sequentially provided.

The haptic module 154 can generate a variety of tactile effects in addition to a vibration. Such tactile effects include an effect caused by an arrangement of vertically moving pins that are in contact with the skin of the user; an effect caused by a force of air passing through a jet hole or a suction of air through a suction hole; an effect caused by contacting the user's skin; an effect caused by contact with an electrode; an effect caused by an electrostatic force; and an effect caused by the application of cold and warm temperatures using an element that can absorb or generate heat.

For example, the haptic module 154 can enable a user to sense the tactile effects through a muscle sense of the user's finger or arm, as well as to transfer the tactile effect through direct contact. Optionally, the mobile terminal 100 can include at least two haptic modules 154 according to the configuration of the mobile terminal 100.

The memory 160 can store software programs used for processing and controlling operations performed by the controller 180 or temporarily store data of the mobile terminal 100. For example, the data can include phone book data, messages, still images, and/or video. Moreover, data for various patterns of vibration and/or sound output when a touch input is performed on the touch screen can be stored in the memory unit 160.

The memory 160 can be implemented using one or more types of storage mediums, such as a flash memory, a hard disk type memory, a multimedia card micro type memory, a card type memory, such as a Secure Digital (SD) card or Extreme Digital (xD) card, a random access memory (RAM), a static random access memory (SRAM), a read-only memory (ROM), a programmable ROM (PROM), an electrically erasable programmable read-only memory (EEPROM), a magnetic memory, a magnetic disk, an optical disk, or other type of memory or data storage device. In other embodiments, the memory 160 can be a storage device that can be accessed by the mobile terminal 100 via the Internet.

The interface unit 170 can couple the mobile terminal 100 to external devices. The interface unit 170 can receive data from the external devices or power, and transmit the data or power to internal components of the mobile terminal 100. In addition, the interface unit 170 can transmit data of the mobile terminal 100 to the external devices. The interface unit 170 can include, for example, wired or wireless headset ports, external power supply ports, wired or wireless data ports, memory card ports, ports for connecting a device having an identification module, audio input/output (I/O) ports, video I/O ports, and/or earphone ports.

The identification module is a chip for storing various information for authenticating the authority to use the mobile terminal 100. For example, the identification module can be a user identity module (UIM), a subscriber identity module (SIM) or a universal subscriber identity module (USIM). A device including the identity module (also referred to as an "identifying device") can also be manufactured in the form of a smart card. Therefore, the identifying device can be connected to the mobile terminal 100 via a corresponding port of the interface unit 170.

When the mobile terminal 100 is connected to an external cradle, the interface unit 170 can serve as a conduit to allow power from the cradle to be supplied to the mobile terminal 100, or can serve as a conduit to allow various command signals input by the user via the external cradle to be transmitted to the mobile terminal 100. Various command signals or power provided by the external cradle can be used as signals for recognizing that the mobile terminal 100 is properly loaded in the external cradle.

The controller 180 can control the general operations of the mobile terminal 100. For example, the controller 180 can be configured to perform control and processing associated with voice calls, data communication, and/or video calls. The controller 180 can perform pattern recognition processing to recognize a character or image from a handwriting input or a picture-drawing input performed on the touch screen.

The controller 180 can include a multimedia module 181 for reproducing multimedia data. The multimedia module 181 can be integrated into the controller 180 as shown in FIG. 1, or can be external to the controller 180.

The power supply unit 190 can be an external power source, an internal power source, or a combination thereof. The power supply unit 190 can supply power to other components in the mobile terminal 100.

Various embodiments described herein can be implemented via a computer-readable medium using, for example, software, hardware, or a combination thereof. For example, the components of the mobile terminal 100 described herein can be implemented in hardware using at least application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, and/or combinations thereof. In other embodiments, such components can be implemented by the controller 180.

For example, the procedures or functions described herein can be implemented in software using separate software modules that allow performance of at least one function or operation. Software codes can be implemented by a software application or program written in any suitable programming language. The software codes can be stored in the memory 160 and executed by the controller 180.

FIG. 2A is a front perspective view of the mobile terminal 100 in accordance with one embodiment of the present invention. In FIG. 2A, the mobile terminal 100 is shown to have a bar type terminal body.

It should be understood, however, that the mobile terminal 100 is not limited to a bar type terminal body and can have various other body types. Examples of such body types include a slide type body, folder type body, swing type body, a swivel type body, or combinations thereof. Although the disclosure herein is primarily with respect to a bar-type mobile terminal 100, it should be understood that the disclosure can be applied to other types of mobile terminals.

As shown in FIG. 2A, the case of the mobile terminal 100 (otherwise referred to as a "casing," "housing," or "cover") forming the exterior of the mobile terminal 100 can include a front case 101 and a rear case 102. Various electronic components are installed in the space between the front case 101 and the rear case 102. One or more intermediate cases can be additionally disposed between the front case 101 and the rear case 102. For example, the front case 101 and the rear case 102 can be made by injection-molding of a synthetic resin or can be made using a metal, such as stainless steel (STS) or titanium (Ti).

The display unit 151, the audio output module 152, the camera 121, user input modules 130a and 130b, the microphone 122, or the interface unit 170 can be situated on the mobile terminal 100, and specifically, on the front case 101.

As shown in FIG. 2A, for example, the display unit 151 can be configured to occupy a substantial portion of the front face 156 of the front case 101. As also shown in FIG. 2A, the audio output unit 152 and the camera 121 can be arranged in proximity to one end of the display unit 151, and the user input module 130a and the microphone 122 can be located in proximity to another end of the display unit 151. As further shown in FIG. 2A, the user input module 130b and the interface unit 170 are arranged on the sides of the front case 101 and the rear case 102.

The user input unit 130 described previously with respect to FIG. 1 can be configured to receive a command for controlling an operation of the mobile terminal 100 and can include one or more user input modules 130a and 130b shown in FIG. 2A. The user input modules 130a and 130b can each be referred to as a "manipulation unit" and can be configured to employ various methods and techniques of tactile manipulation and response to facilitate operation by the user.

The user input modules 130a and 130b can be configured for inputting different commands relative to one another. For example, the user input module 130a can be configured to allow a user to input commands such as "start," "end," and "scroll" to the mobile terminal 100. The user input module 130b can allow a user to input a command for adjusting the volume of the audio output unit 152 or a command for switching to a touch recognition mode of the display unit 151.

Figure 2B:
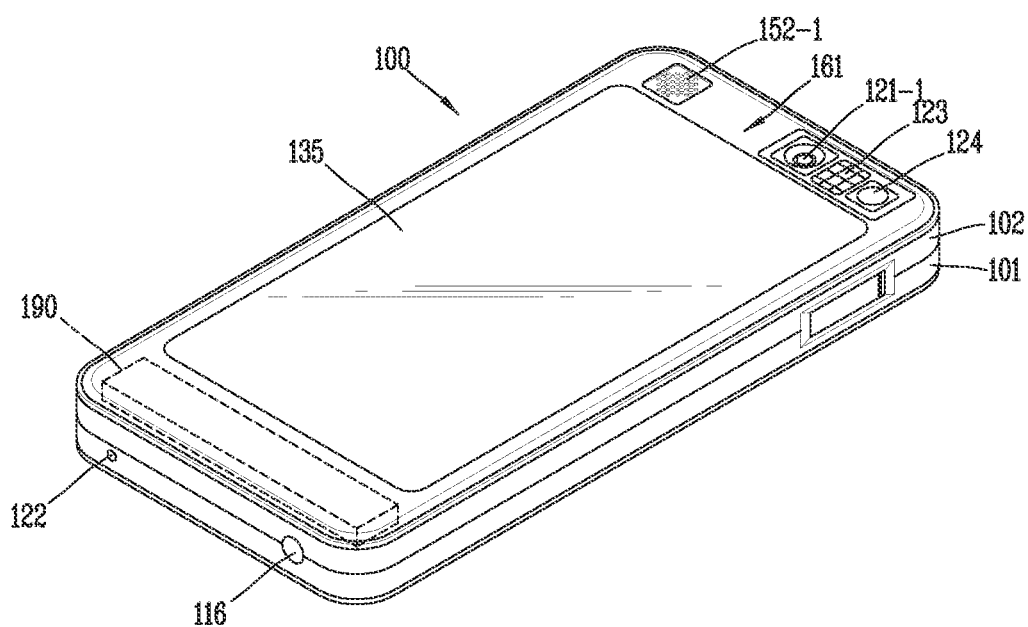
FIG. 2B is a rear perspective view of a mobile terminal in accordance with one embodiment of the present invention.

FIG. 2B is a rear perspective view of the mobile terminal 100 in accordance with one embodiment of the present invention. As shown in FIG. 2B, a camera 121-1 can be additionally located on a rear surface 161 of the rear case 102. The camera 121-1 has a direction of view that is substantially opposite to the direction of view of the camera 121 shown in FIG. 2A. The cameras 121 and 121-1 can have different resolutions, or different pixels counts, with respect to one another.

For example, the camera 121 can operate with a relatively lower resolution than the camera 121-1 in order to capture an image of the user to allow immediate transmission of the image to another user, whereas the camera 121-1 can operate with a relatively higher resolution than the camera 121 to capture images of general objects which may not require immediate transmission. For example, the cameras 121 and the camera 121-1 can be configured to rotate or to pop-up on the mobile terminal 100.

Additional camera related components, such as a flash 123 and a mirror 124, can be located adjacent to the camera 121-1. When an image of a subject is captured with the camera 121-1, the flash 123 illuminates the subject. The mirror 124 allows self-image capturing by allowing the user to see himself when the user desires to capture his own image using the camera 121-1.

The rear surface 161 of the rear case 102 can further include a second audio output module 152-1. The second audio output module 152-1 can support a stereo sound function in conjunction with the audio output module 152 shown in FIG. 2A and can be used for communication during a phone call when the mobile terminal 100 is in a speaker phone mode.

A broadcasting signal receiving antenna 116 can be additionally attached to the side of the body of the mobile terminal 100 in addition to an antenna used for telephone calls. The broadcasting signal receiving antenna 116 can form a part of the broadcast receiving module 111 shown in FIG. 1, and can be set in the body of the mobile terminal 100 such that the broadcasting signal receiving antenna 116 can be pulled out and retracted into the body of the mobile terminal 100.

FIG. 2B shows the power supply unit 190 for providing power to the mobile terminal 100. For example, the power supply unit 190 can be situated either inside the mobile terminal 100 or detachably coupled to the mobile terminal 100.

As shown in FIG. 2B, a touch pad 135 for sensing a touch by the user can be located on the rear case 102. In one embodiment, the touch pad 135 and the display unit 151 can be light transmissive such that the information displayed on display unit 151 can be output on both sides of the display unit 151 and can be viewed through the touch pad 135. In another embodiment, a second display unit in addition to display unit 151 illustrated in FIG. 2A can be located on the touch pad 135 to form a touch screen on the rear case 102.

The touch pad 135 is operated in association with the display unit 151 of the front case 101. The touch pad 135 can be located in parallel with the display unit 151 and behind the display unit 151. The touch pad 135 can have the same or smaller size than the display unit 151.

The various embodiments described herein can be used alone or in combination. Moreover, the various embodiments described herein may be combined with the previously described user interface of the mobile terminal 100 and can be implemented by the mobile terminal 100 as described with reference to FIGS. 1 to 2B.

Various techniques for controlling the operation of the mobile terminal 100 will now be described with reference to FIGS. 3 to 11D.

The controller 180 can receive an application from an external device or a server configured to provide an application by controlling the wireless communication unit 110 or the interface unit 170. The controller 180 can store and install the received application in the memory 160.

After the application is installed, the memory 160 can store a program and data of the application. Furthermore, the controller 180 can manage the installation information of the application and can generate an object (also referred to as an "icon") configured to execute the installed application and store the generated object in the memory 160.

When a request for an idle screen display is received, the controller 180 can display an idle screen (also referred to as a "standby screen") including at least one icon stored in the memory 160 on the display unit 151. The icon displayed on the idle screen can be selected via the user input unit 130. When the icon is selected, an application corresponding to the selected icon can be executed by the controller 180.

Figure 3:
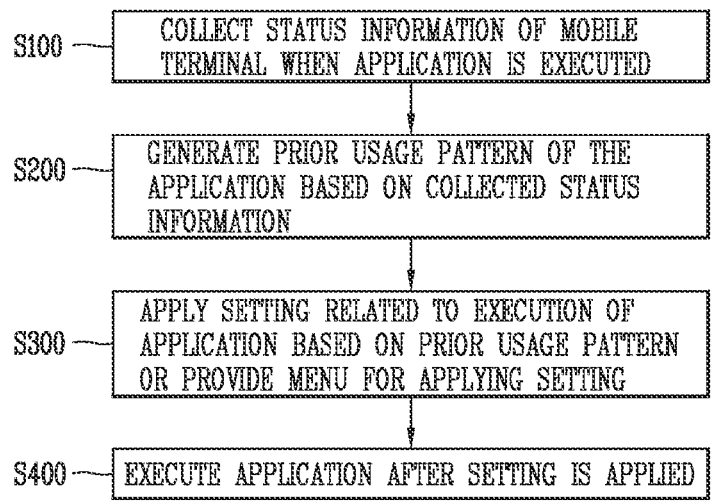
FIG. 3 is a flow chart illustrating a process for executing an application in accordance with one embodiment of the present invention.

FIG. 3 is a flow chart illustrating a process for executing an application in accordance with one embodiment of the present invention.

When a command for executing an application is detected via the user input unit 130, the controller 180 can execute the application. The controller 180 collects status information of the mobile terminal 100 and stores the collected status information in the memory 160 [S100]. The status information of the mobile terminal 100 can include time information and/or position information.

For example, the time information can include a time at which the application is executed or the length of time that the application is in use. The position information of the mobile terminal 100 can be with respect to the time at which the application is executed or the time during which the application is used.

For example, the position information can include location information and/or information regarding the means by which the mobile terminal 100 is moving when the application is executed.

The wireless communication unit 110 can obtain location information from a repeater, an access point, or one or more satellites. The sensing unit 140 can include an acceleration sensor, which can obtain acceleration information of the mobile terminal 100. The controller 180 can determine the means by which the mobile terminal 100 is moving based on the location information and the acceleration information.

The sensing unit 140 can also include an angular velocity sensor, which can obtain angular velocity information of the mobile terminal 100. The sensing unit 140 can further include a geomagnetic sensor, which can obtain direction information of the mobile terminal 100. The angular velocity information, direction information, and the acceleration information can be used by the controller 180 to determine the means by which the mobile terminal 100 is moving.

For example, when the speed or acceleration of the mobile terminal 100 is greater than a threshold value, the controller 180 can recognize that the means by which the mobile terminal 100 is moving is a vehicle. When the mobile terminal 100 periodically stops at a bus stop or a subway stop, the controller 180 can detect the periodic stops and determine that the means by which the mobile terminal 100 is moving is public transportation. Otherwise, the controller 180 can determine that the means by which the mobile terminal 100 is moving is an automobile. Furthermore, when the speed or acceleration of the mobile terminal 100 is greater than a threshold value, the controller 180 can recognize that the user of the mobile terminal 100 is traveling by foot.

The controller 180 generates a prior usage pattern of one or more applications that is used to control when the one or more applications are executed based on the status information stored in the memory 160 [S200]. The prior usage pattern can be used to execute an application at a particular time, a particular location, or when a particular means by which the mobile terminal 100 is moving is detected. For example, the prior usage pattern can be based on information relating to the number of times that an application is executed, the length of time that an application is used, and status information of the mobile terminal 100 stored in the memory 160. The controller 180 can store the prior usage pattern in the memory 160.

The controller 180 applies a setting related to execution of an application or provides a menu for applying such a setting based on the prior usage pattern [S300]. The controller 180 can detect the status information of the mobile terminal 100 and can either apply the setting related to execution of an application or provide a menu for applying such a setting each time that an application is executed in the mobile terminal 100.

The setting related to execution of an application can include a hardware setting and/or a software setting. The hardware setting can include a setting for adjusting the status of the modules of the mobile terminal 100, such as the wireless communication unit 110, the user input unit 130, and the sensing unit 140. For example, the status of the modules can be adjusted to an active state or an inactive state. The hardware setting can be used to control power consumption of the battery of the mobile terminal 100.

For example, the hardware setting can be used to activate or deactivate a module of the mobile terminal 100 configured to perform a communication function, such as the wireless Internet module 113, the short-range communication module 114, or the location information module 115. Alternatively, the hardware setting can be used to activate or deactivate a module of the mobile terminal 100 configured to detect status information of the mobile terminal 100, such as the touch sensor 151, the proximity sensor 141, the acceleration sensor, the angular velocity sensor, or the geomagnetic sensor.

The hardware setting can be used to adjust the brightness of the display unit 151, adjust the volume of the audio output module 152, activate or deactivate the alarm unit 153, or adjust the strength of the haptic module 154.

The software setting can be used to control the order in which applications are executed, the menus to be executed in each application, or a method for displaying a standby screen on the touch screen 151. The software setting can be further used to efficiently use the resources of the mobile terminal 100 and to reduce the time needed to perform an operation via the application at the user's position.

For example, the controller 180 can be set to execute a first application in a particular situation and to execute a second application when the user terminates the first application. Moreover, the controller 180 can be set to execute an application in a particular situation and then to immediately execute a first menu. The controller 180 can set the position, size, or order of icons displayed on the standby screen for executing each application in a particular situation.

The controller 180 can automatically apply a software setting related to execution of an application in a particular situation. Alternatively, the controller 180 can provide an interface that allows the user to apply such a software setting.

The controller 180 can control the touch screen 151 to display menus that can be used to apply the software setting related to execution of an application. As such, a user of the mobile terminal 100 can apply such a software setting related to execution of an application using the menus.

After a setting related to execution of an application is applied, the controller 180 executes the application (step S400). The controller 180 can check whether or not a setting for executing an application has been applied and can execute the application after such a setting has been applied.

After a setting related to execution of an application is applied, the controller 180 can execute the application at a predetermined time according to the prior usage pattern. The controller 180 can execute an application in response to a command detected by the user input unit 130 before the setting related to execution of an application has been applied.

The prior usage pattern can indicate various menus that are to be executed, where the menus are provided by an application. The controller 180 can apply a setting related to execution of a menu based on the prior usage pattern or provide a menu for applying a setting for executing the menu. When a setting for executing a menu is applied, the controller 180 can execute the menu.

Figure 4A:
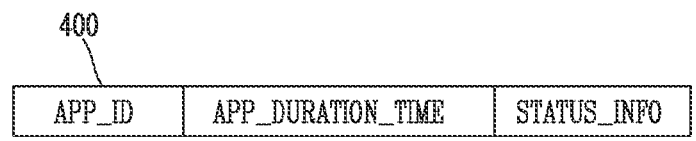
FIG. 4A shows the structure of an execution information table of an application in accordance with one embodiment.
Figure 4B:
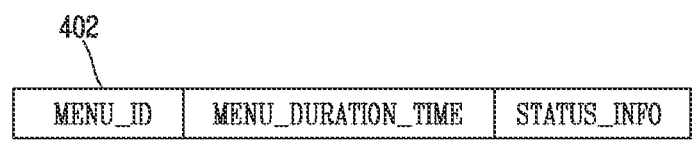
FIG. 4B shows the structure of an execution information table of a menu provided by an application in accordance with one embodiment.
Figure 4C:
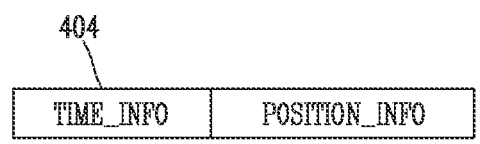
FIG. 4C shows the structure of a status information table of a mobile terminal in accordance with one embodiment.

FIGS. 4A through 4C illustrate the structures of various tables, which include execution information of an application, execution information of a menu, status information of the mobile terminal 100, and configuration information for executing an application in accordance with various embodiments.

FIG. 4A shows the structure of an execution information table 400 of an application in accordance with one embodiment. The execution information table 400 can include a field APP_ID for storing identification information of an application, a field APP_DURATION_TIME for storing a usage time of the application, and a field STATUS_INFO for indicating status information of the mobile terminal 100 when the application is executed. The controller 180 can calculate a duration time representing the time that an application is used by using the time at which the application is executed and the time at which the application is terminated. The controller 180 can store the calculated duration time in a field APP_DURATION_TIME.

FIG. 4B shows the structure of an execution information table 402 of a menu provided by an application in accordance with one embodiment. The execution information table 402 can include a field MENU_ID for storing identification information of a menu, a field MENU_DURATION_TIME for storing an execution a usage time of the menu, and a field STATUS_INFO for indicating status information of the mobile terminal 100 when the menu is executed. The controller 180 can calculate a duration time representing the time that a menu is used by using the time at which the menu is executed and the time at which the menu is terminated. The controller 180 can store the calculated duration time in the field MENU_DURATION_TIME.

FIG. 4C shows the structure of a status information table 404 of the mobile terminal 100 in accordance with one embodiment. The status information table 404 can be joined to the field STATUS_INFO shown in FIG. 4A or FIG. 4B. The status information table 404 can include a time information field TIME_INFO and/or position information field POSITION_INFO.

When the mobile terminal 100 is operated, the controller 180 can obtain time information from a repeater or an internal counter. The controller 180 can further obtain location information of the mobile terminal 100 via the location information module 115, the repeater, or an access point. The controller 180 can further obtain motion information of the mobile terminal 100 via the acceleration sensor, the angular velocity sensor, or the geomagnetic sensor. The controller 180 can further obtain the information regarding the means by which the mobile terminal 100 is moving based on the location information and the motion information.

When the mobile terminal 100 is first connected to an access point, the controller 180 can register the location information by using information, such as a Service Set Identifier (SSID) or a MAC address, for identifying the access point. Thereafter, when the mobile terminal 100 is connected to the same access point, the controller 180 checks the registered location information to obtain the location information of the mobile terminal 100.

The status information of the mobile terminal 100 can be obtained from an external device having a sensor for sensing status information. For example, the wireless communication unit 110 can obtain a speed at which the mobile terminal 100 moving from a speedometer (also referred to as a "speed indicator") of a vehicle.

In executing an application for reproducing music (also referred to as a "music play application"), the controller 180 can select music having a strong beat when the speed of the vehicle is increased and can select soft music when the speed of the vehicle is decreased. The controller 180 can deactivate the audio output module 152 or no longer play the music when the vehicle is suddenly stopped to minimize distractions to the user.

Figure 5:
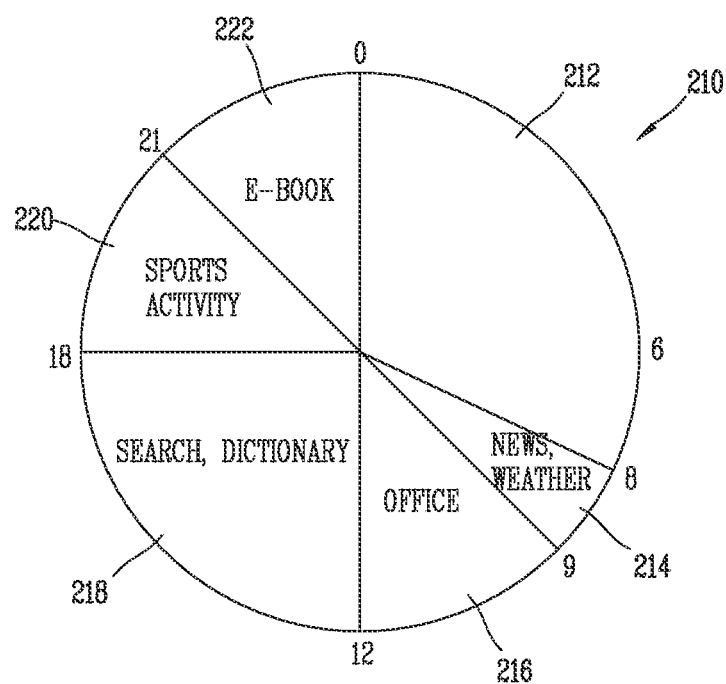
FIG. 5 is a conceptual view of a prior usage pattern in accordance with one embodiment.

FIG. 5 is a conceptual view of a prior usage pattern in accordance with one embodiment. FIG. 5 shows an application execution diagram 210, which includes various applications that have been frequently executed or used for a substantial period of time in the mobile terminal 100 during various time zones (also referred to as a "time slots") 212, 214, 216, 218, 220 and 222. For example, the time zone 214 represents a period of time from 8:00 a.m. to 9:00 a.m. and the time zone 218 represents a period of time from 12:00 p.m. to 6:00 p.m.

In the embodiment of FIG. 5, the applications identified in the application execution diagram 210 have been executed a number of times or for a period of time, where the number of times or the period of time has exceeded a threshold value. Since the applications in execution diagram 210 are likely to be executed during the same corresponding time zones, the controller 180 can execute the applications when each corresponding time zone arrives.

The controller 180 can determine whether or not there is a need to apply a setting before executing each of the applications. For example, when a news or weather application is executed according to the prior usage pattern, the controller 180 can check the prior usage pattern and can activate a module of the wireless communication unit 110, such as the wireless internet module 113, to receive news or weather content in real time.

The controller 180 can check the prior usage pattern to determine whether news or weather content is frequently downloaded by the user before an application is executed and control the wireless communication unit 110 to update the news or weather content prior to executing the application. Alternatively, the controller 180 can check the prior usage pattern to determine whether the user frequently executes the weather application after terminating the news application. In such a case, the controller 180 can automatically execute the weather application upon detecting a command for terminating the news application via the user input unit 130.

FIGS. 6A to 6D are conceptual views illustrating a process of executing applications in accordance with an embodiment.

Figure 6A:
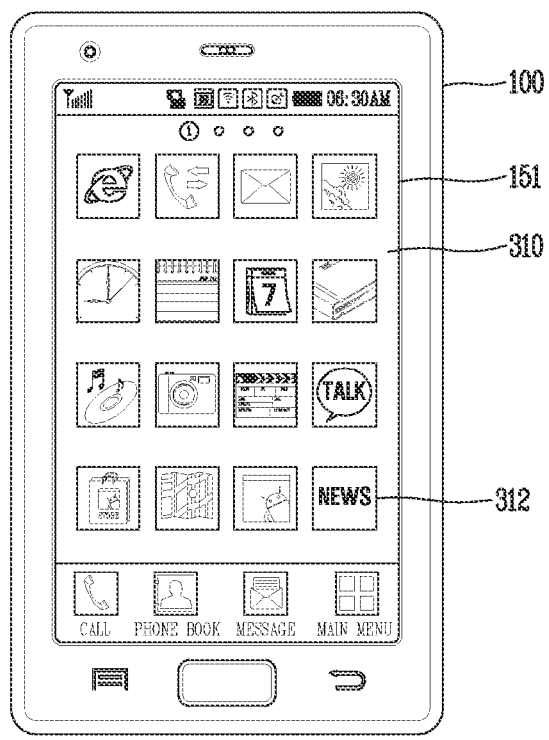
FIGS. 6A to 6D are conceptual views illustrating a process of executing applications in accordance with an embodiment.

As shown in FIG. 6A, the standby screen 310 of the mobile terminal 100 can include one or more icons that are configured to execute an application. For example, the icon 312 can be configured to execute a news application. The controller 180 can execute the news application when the user input unit 130 detects an input for selecting the icon 312.

When the news application is frequently executed from 8:00 a.m. to 9:00 a.m. as indicated in FIG. 5, the controller 180 can apply a setting before 8:00 a.m. that enables wireless access to the Internet. For example, the controller 180 can activate the wireless Internet module 113 before 8:00 a.m.

Figure 6B:
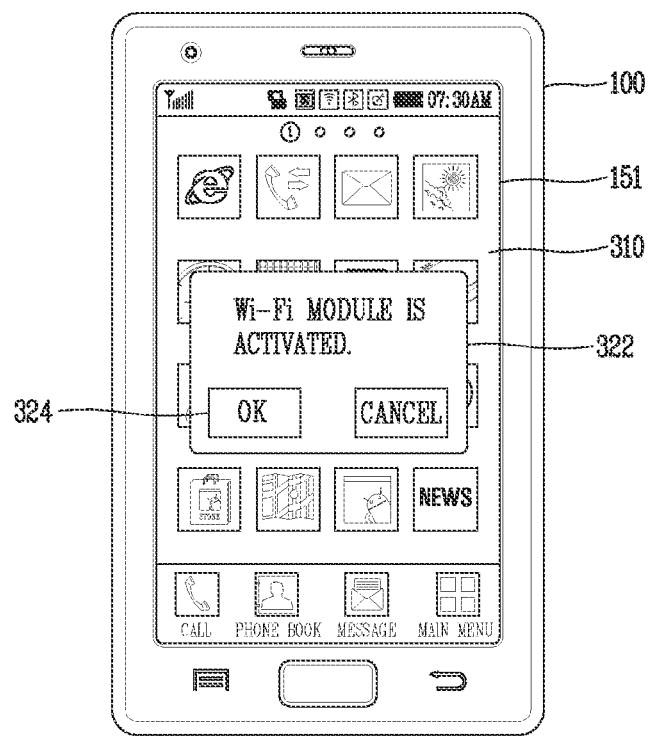

Alternatively, as shown in FIG. 6B, the controller 180 can provide a menu 322 on the standby screen 310 for applying the setting that enables wireless access to the Internet. When an input for selecting an OK button 324 is detected via the touch screen 151 or the user input unit 130, the controller 180 can activate the wireless Internet module 113.

When the news application is frequently executed from 8:00 a.m. to 9:00 a.m. as indicated in FIG. 5, the controller 180 can download news content before 8:00 a.m. For example, the controller 180 can update news content via the wireless Internet module 113.

Figure 6C:
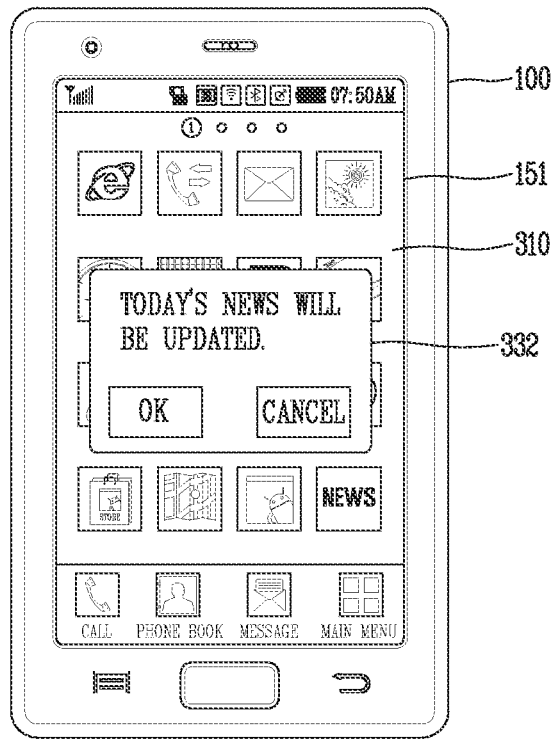

Alternatively, as shown in FIG. 6C, the controller 180 can provide a menu 332 on the standby screen 310 for updating news content. When an input for selecting an OK button 326 is detected via the touch screen 151 or the user input unit 130, the controller 180 can update news content via the wireless Internet module 113.

Figure 6D:
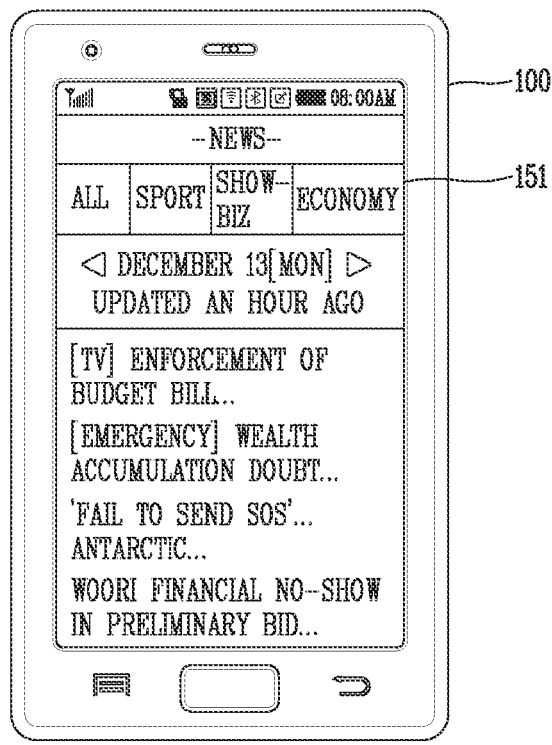

As shown in FIG. 6D, the controller 180 can automatically execute the news application at 8:00 a.m. Alternatively, the controller 180 can execute the news application corresponding to the icon 312 when an input for selecting the icon 312 is detected via the touch screen 151 or the user input unit 130.

When execution of an application fails or the application is terminated, the controller 180 can cancel the setting related to execution of the application. For example, the controller 180 can deactivate the wireless Internet module 113 when execution of an application fails or the application is terminated.

Figure 7A:
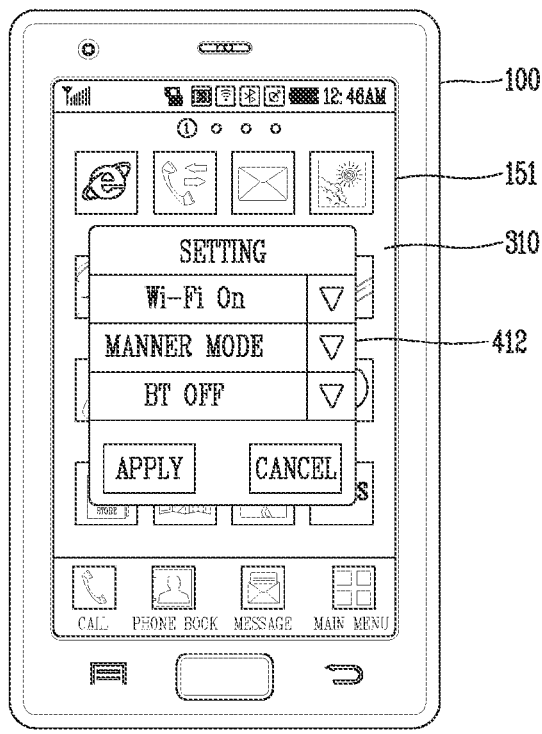
FIG. 7A shows a display screen of a touch screen illustrating execution of an application of a mobile terminal in accordance with one embodiment.

FIG. 7A shows a display screen of the touch screen 151 illustrating execution of an application of the mobile terminal 100 in accordance with one embodiment.

When a number of settings related to execution of an application are provided, the controller 180 can apply the number of settings related to execution of the application based on the prior usage pattern. Alternatively, the controller 180 can provide a menu for applying one or more of the number of settings related to execution of an application, where the one or more of the number of settings are different from a current setting.

For example, with reference to FIG. 7A, when a number of settings related to the news application are applied based on the prior usage pattern, a menu 412 can be provided for applying a Wi-Fi® setting, an etiquette mode setting, and a Bluetooth® setting on the standby screen 310, such that the settings indicated in the menu 412 are different from a current setting. When the menu 412 is selected, the controller 180 can apply a number of settings related to the news application based on the prior usage pattern.

Figure 7B:
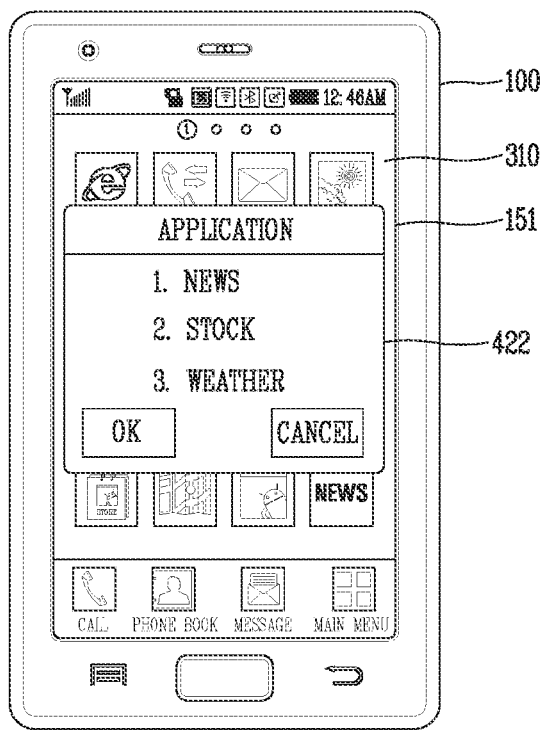
FIG. 7B shows a display screen of a touch screen illustrating execution of an application of a mobile terminal in accordance with one embodiment.

FIG. 7B shows a display screen of the touch screen 151 illustrating execution of an application of the mobile terminal 100 in accordance with one embodiment.

The controller 180 can apply a setting related to an execution order of a number of applications based on the prior usage pattern and can execute the applications according to the execution order. The controller 180 can provide an interface allowing for editing of the setting with respect to the execution order. For example, the editing can involve changing the execution order of the applications or naming the execution order of the applications. When the execution order of the applications is changed, the controller 180 can execute the applications according to the changed order and not according to the order indicated by the prior usage pattern.

For example, with reference to FIG. 7B, when a setting regarding the execution order of the news, stock and weather applications is applied based on the prior usage pattern, information 422 indicating the execution order of the applications can be provided on the standby screen 310. Accordingly, the controller 180 can first execute the news application. The controller 180 can then execute the stock application when an input for terminating the news application is detected via the touch screen 151 or the user input unit 130. The controller 180 can then execute the weather application when an input for terminating the stock application is detected via the touch screen 151 or the user input unit 130.

Figure 8A:
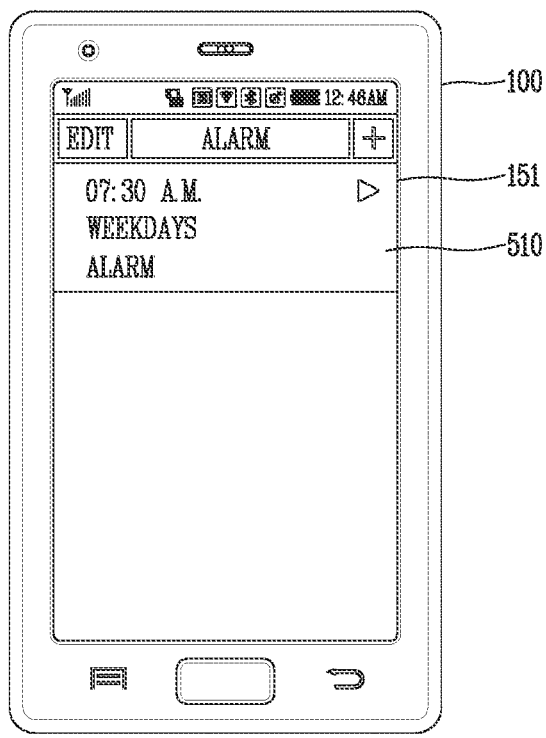
FIGS. 8A and 8B are display screens of a touch screen illustrating a process for executing an application in a mobile terminal according to one embodiment.
Figure 8B:
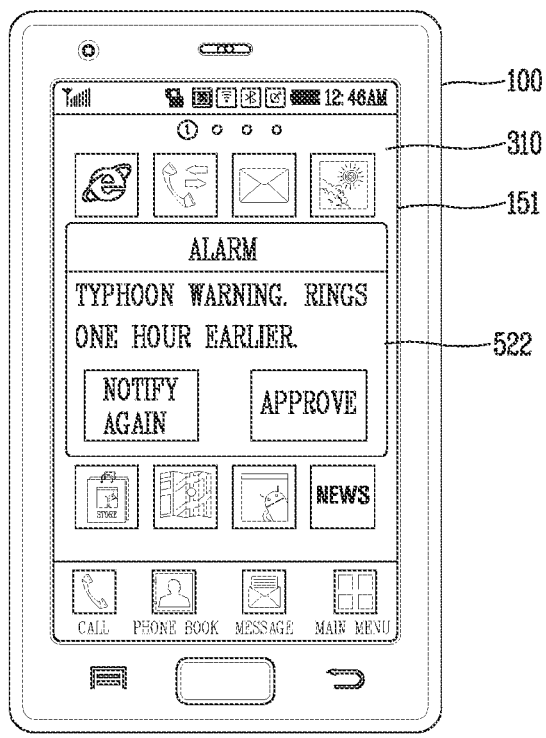

FIGS. 8A and 8B are display screens of the touch screen 151 illustrating a process for executing an application in the mobile terminal 100 according to one embodiment.

The wireless communication unit 110 can receive lifestyle information from a server via a network. The lifestyle information can include weather information and/or traffic information. The weather information and the traffic information can affect the setting or configuration related to execution of an application. More specifically, the controller 180 can apply a setting related to execution of an application or provide a menu for applying a setting related to execution of an application based on the lifestyle information. For example, the controller 180 can execute an alarm application earlier or later relative to a current setting according to weather information or traffic information.

The lifestyle information can be obtained from an external device, which can be equipped with a sensor for detecting such lifestyle information. For example, the wireless communication unit 110 can obtain weather information from a vehicle having a rainwater sensor. In such a case, the controller 180 can activate a Bluetooth® module for executing an application that uses speech to provide a weather forecast at a current location or an application that uses speech to provide a weather forecast associated with a destination in a navigation application. As another example, the controller 180 can select music set to be played when it rains and to add the music to a playlist when a music reproduction application is executed.

With reference to FIG. 8A, the controller 180 can provide a menu on the screen 510 for setting an alarm time based on the prior usage pattern. As shown in FIG. 8A, a menu for setting an alarm time can be displayed on the screen 510 of the mobile terminal 100. When an input for setting the alarm time via the touch screen 151 or the user input unit 130 is detected, the controller 180 can set the alarm time according to the detected input.

With reference to FIG. 8B, the controller 180 can execute the alarm application when the alarm time arrives. The wireless communication unit 110 can receive lifestyle information from a server before the alarm time. The controller 180 can apply the alarm time based on the received lifestyle information.

For example, when the lifestyle information is weather information and a typhoon warning is given, the controller 180 can set the alarm time to an earlier time. When the lifestyle information is traffic information and the traffic information indicates smooth traffic flow, the controller 180 can set the alarm time to a later time. The controller 180 can provide a menu 522 for applying a new alarm time on the standby screen 310.

Figure 9A:
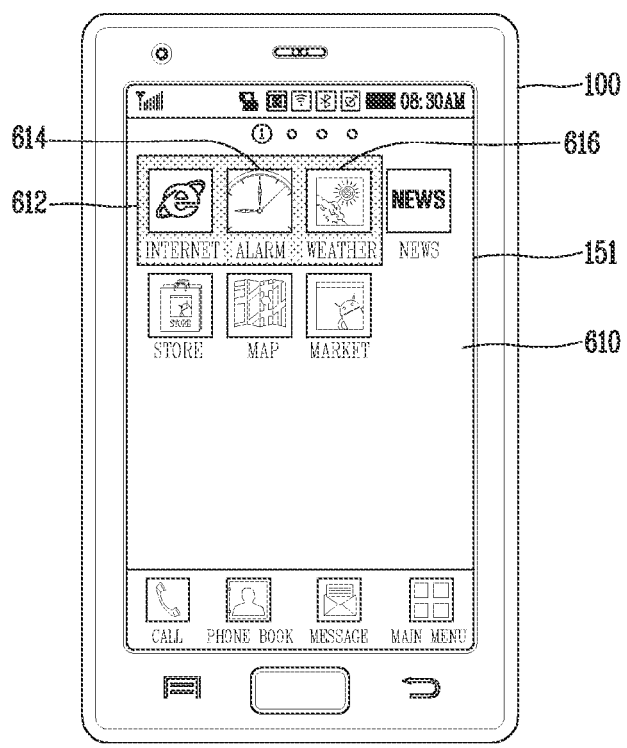
FIGS. 9A and 9B are display screens of a touch screen illustrating a process for executing an application of a mobile terminal in accordance with an embodiment.
Figure 9B:
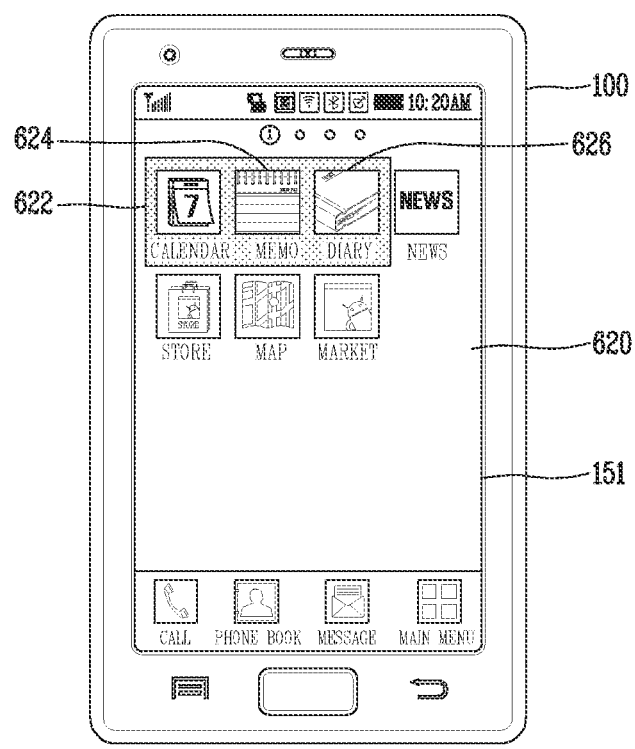

FIGS. 9A and 9B are display screens of the touch screen 151 illustrating a process for executing an application of the mobile terminal 100 in accordance with an embodiment.

The controller 180 can change the configuration of icons that are configured to execute each application displayed on a standby screen of the mobile terminal 100 based on the prior usage pattern. For example, the controller 180 can distinguish one or more icons configured to execute applications that are frequently executed at a particular time slot or at a particular place from one or more icons configured to execute applications that are not frequently executed.

With reference to FIG. 9A, when the Internet, alarm, and weather applications are frequently executed between 8:00 a.m. and 9:00 a.m. according to the prior usage pattern, the controller 180 can distinguish the displayed icons 612, 614, and 616 configured to respectively execute the Internet, alarm, and weather applications from other icons on a standby screen 610. For example, as shown in FIG. 9A, the icons 612, 614, and 616 can be positioned at an area that is distinguished from other icons, displayed in order, or displayed to appear larger than other icons.

With reference to FIG. 9B, when the calendar, memo, and diary applications are frequently executed between 9:00 a.m. and 12:00 a.m. according to the prior usage pattern, the controller 180 can distinguish the displayed icons 622, 624, and 626 configured to respectively execute the calendar, memo, and diary applications from other icons on a standby screen 620. For example, as shown in FIG. 9B, the icons 622, 624, and 626 can be positioned at an area distinguished from other icons, displayed in order, or displayed to appear larger than other icons.

Figure 10A:
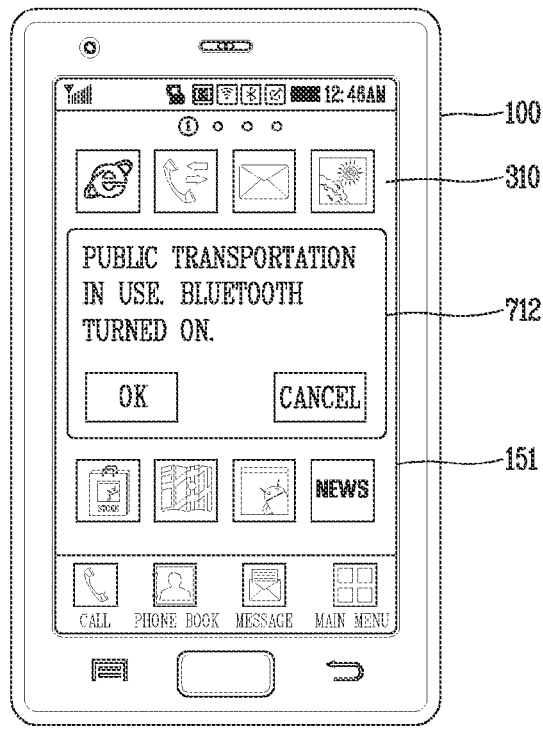
FIGS. 10A and 10B are display screens of a touch screen illustrating a process for executing an application according to one embodiment.
Figure 10B:
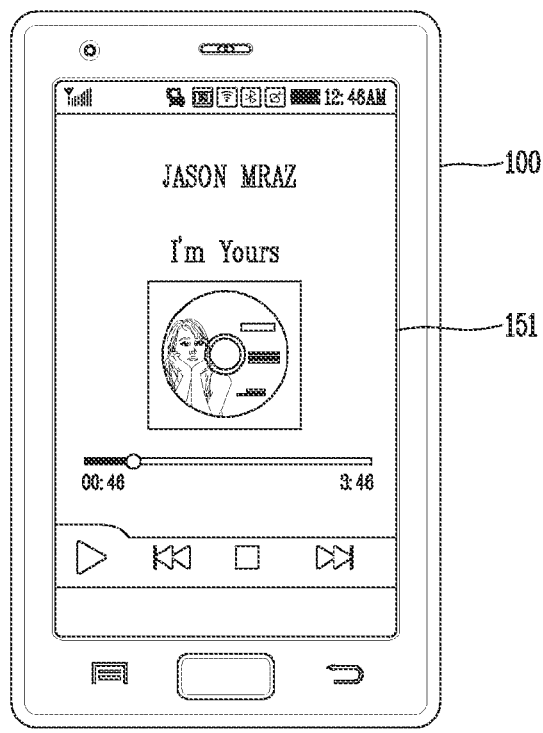

FIGS. 10A and 10B are display screens of the touch screen 151 illustrating a process for executing an application according to one embodiment.

With reference to FIG. 10A, when the means by which the mobile terminal 100 is moving is detected to be public transportation, the controller 180 can identify an application that has been frequently executed when public transportation was used. For example, the controller 180 can apply a setting related to execution of the music reproduction application if the music reproduction application has been frequently executed when public transportation was used. The controller 180 can activate a Bluetooth® module, i.e., the short-range communication module 114 of the mobile terminal 100, or provide a menu 712 on the standby screen 310 for activating the Bluetooth® module.

With reference to FIG. 10B, the controller 180 can activate the Bluetooth® module and check whether a Bluetooth® device is connected. When a Bluetooth® device is connected, the controller 180 can execute the music reproduction application. When a Bluetooth® device is not connected within a period of time, the controller 180 does not execute the music reproduction application and deactivates the Bluetooth® module.

When the means by which the mobile terminal 100 is moving is detected by the controller 180 to be an automobile, the controller 180 can determine whether or not the user of the mobile terminal 100 is currently driving based on acceleration information and can identify an application that has been frequently executed when the user of the mobile terminal 100 drives. For example, the controller 180 can apply a setting related to execution of a navigation application if the navigation application has been frequently executed when the user of the mobile terminal 100 drives. The controller 180 can activate the location information module 115 or provide a menu for activating the location information module 115 on the touch screen 151.

When the means by which the mobile terminal 100 is moving is detected by the controller 180 to be an automobile, the controller 180 can determine that the user of the mobile terminal 100 is not currently driving based on acceleration information and can identify an application that has been frequently executed when the user of the mobile terminal 100 does not drive. For example, the controller 180 can apply a setting related to execution of a message application if the message application has been frequently executed. The controller 180 can change or convert the mode of the mobile terminal 100 to a character input mode or provide a menu for changing the mode of the mobile terminal 100 to the character input mode on the touch screen 151.

When the means by which the mobile terminal 100 is moving is detected by the controller 180 to be walking, the controller 180 can identify an application that has been frequently executed when the user walks. For example, when the frequently executed application is the music reproduction application, the controller 180 can activate the short-range communication module 114 and check whether a Bluetooth® device is connected. When a Bluetooth® device is connected, the controller 180 can execute the music reproduction application. When a Bluetooth® device is not connected within a period of time, the controller 180 does not execute the music reproduction application and deactivates the short-range communication module 114.

When the frequently executed application is an exercise management application, the controller 180 can activate the location information module 115 or provide a menu for activating the location information module 115. When the location information module 115 is activated, the controller 180 can execute the exercise management application.

FIGS. 11A to 11D are display screens of the touch screen 151 illustrating a process for applying a configuration related to execution of an application in the mobile terminal 100 according to one embodiment.

The touch screen 151 or the user input unit 130 can detect an input for selecting the coverage of the prior usage pattern. In such a case, the controller 180 can apply a setting related to execution of an application or provide a menu for applying the setting in relation to execution of the application.

Figure 11A:
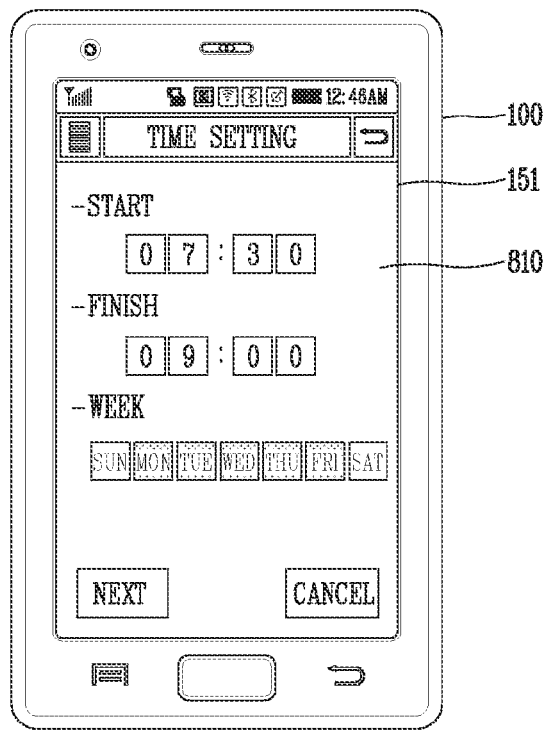
FIGS. 11A to 11D are display screens of a touch screen illustrating a process for applying a configuration related to execution of an application in a mobile terminal according to one embodiment.

As shown in FIG. 11A, the controller can provide a menu 810 for selecting the coverage of the prior usage pattern on the touch screen 151. For example, the menu 810 can be used to input time information and/or position information.

Figure 11B:
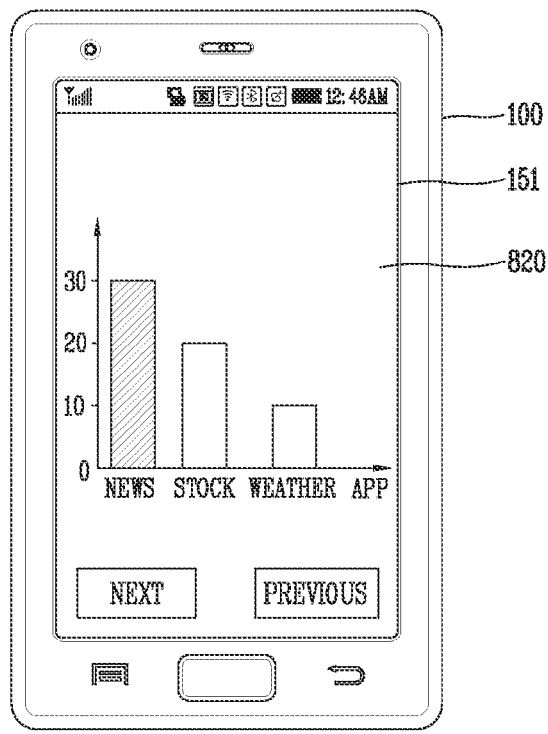

As shown in FIG. 11B, the controller 180 can display information on the screen 820 regarding applications that have been frequently executed or executed for a substantial period of time with respect to the time information and/or position information input via the menu 810. The touch screen 151 or the user input unit 130 can detect an input for selecting an application on the screen 820 to which a setting is to be applied according to the prior usage pattern.

Figure 11C:
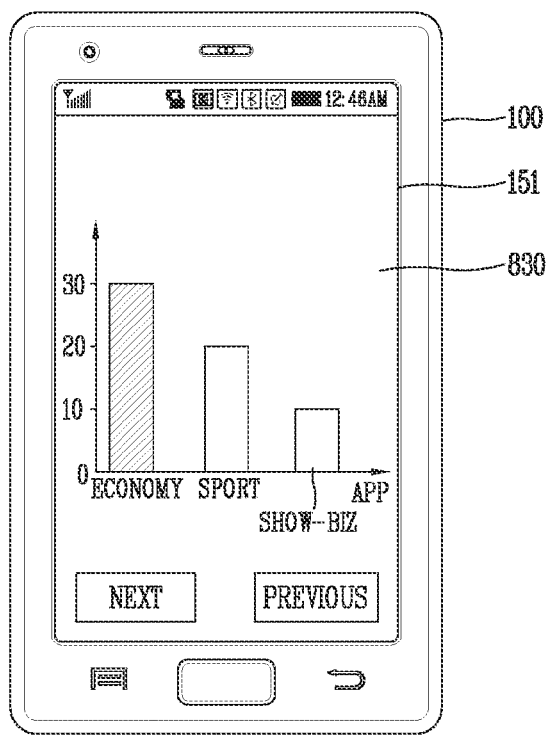

As shown in FIG. 11C, the controller 180 can display information regarding menus that have been frequently executed or executed for a substantial period of time in an application selected from among the applications displayed on the screen 820. The touch screen 151 or the user input unit 130 can detect an input for selecting a menu to which a setting is to be applied according to the prior usage pattern from among the menus displayed on the screen 830.

Figure 11D:
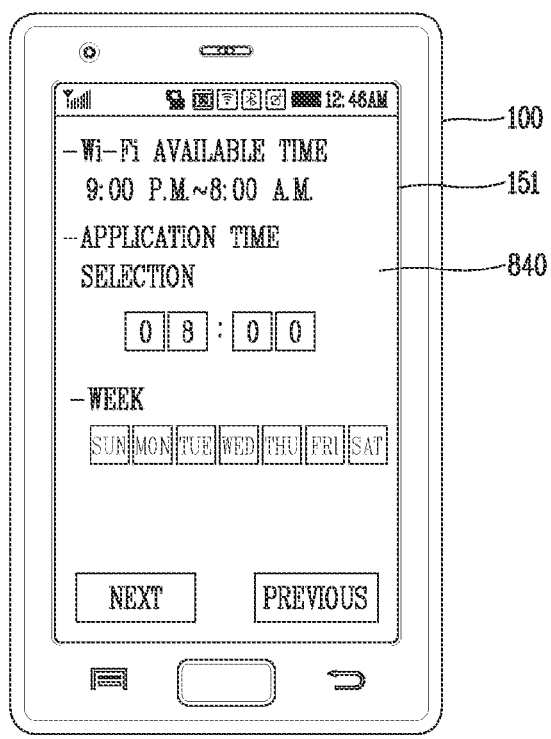

As shown in FIG. 11D, the controller 180 can display information associated with a setting related to execution of a menu selected from the screen 830. Information related to modifying the prior usage pattern of the mobile terminal 100 can be further displayed. For example, when a setting related to execution of a menu includes activation of a Wi-Fi® module, the controller 180 can display information regarding a time slot during which Wi-Fi® access is available on the screen 840. The touch screen 151 or the user input unit 130 can receive an input for selecting a time at which the setting related to execution of a menu selected by the user is applied in the Wi-Fi® available time slot.

The controller 180 can activate the Wi-Fi® module at 8:00 a.m. from Monday to Friday with respect to a financial menu of the news application and update related content. When the updating is completed, the controller 180 can execute the financial menu of the news application.

In one embodiment, since the setting or configuration required for the smooth execution of applications is automatically applied, user convenience can be improved and the utilization of applications can be maximized.

Since a setting related to execution of an application can be applied in a timely manner, power consumption of a battery can be reduced via a hardware related setting, and time can be saved via a software related setting.

In addition, since the existing sensors provided in the mobile terminal 100 can be appropriately utilized to implement such functions, additional hardware is not needed. Therefore, the cost of the mobile terminal 100 is not increased.

In various embodiments, the previously described method can be implemented as codes that can be read by a computer in a program-recorded medium. The computer-readable medium includes various types of recording devices in which data read by a computer system is stored. The computer-readable medium may include a ROM, a RAM, a CD-ROM, a magnetic tape, a floppy disk, an optical data storage device, and the like. The computer-readable medium also includes implementations in the form of carrier waves or signals (e.g., transmission via the Internet). It should be understood that the mobile terminal 100 and the methods disclosed herein are not limited in their application of the configurations and methods, but the entirety or a portion of the embodiments can be selectively combined to be configured into various modifications.

As the embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
a touch screen configured to display information and receive a user input;
a memory configured to store an execution pattern of at least one application, the execution pattern used to control when the at least one application is executed; and
a controller configured to:
set a first setting of the mobile terminal;
generate the execution pattern using status information of the mobile terminal;
select a first application from the at least one application, the first application being as an application to be executed based on the execution pattern;
change the first setting to a second setting based on the execution pattern, the second setting related to execution of the first application;
maintain the second setting if the first application is executed according to the second setting; and
change the second setting back to the first setting if the first application is not executed according to the second setting within a predetermined period of time.

2. The mobile terminal of claim 1, wherein the controller is further configured to:
collect the status information of the mobile terminal; and
generate the execution pattern using the collected status information when the at least one application is executed.

3. The mobile terminal of claim 2, wherein the status information comprises at least time information, position information, or movement information of the mobile terminal.

4. The mobile terminal of claim 3, wherein the position information comprises at least location information of the mobile terminal or information regarding a means by which the mobile terminal is moving.

5. The mobile terminal of claim 2, wherein the status information is obtained from an external device having a sensor configured to detect the status information.

6. The mobile terminal of claim 1, wherein the first or second setting includes at least a screen display setting, an audio output setting, or a wireless communication setting.

7. The mobile terminal of claim 1, further comprising a communication unit configured to receive lifestyle information, wherein the controller is further configured to apply the second setting or provide a menu for applying the second setting based on the lifestyle information.

8. The mobile terminal of claim 7, wherein the lifestyle information comprises at least weather information or traffic information.

9. The mobile terminal of claim 7, wherein the controller is further configured to control a time when the second setting is applied or a time when the first application is executed based on the lifestyle information.

10. The mobile terminal of claim 1, wherein:
the execution pattern indicates a sequence of one or more menus provided by the at least one application; and
the controller is further configured to apply a setting related to execution of a menu based on the execution pattern of the menu.

11. The mobile terminal of claim 1, wherein the controller is further configured to cause the touch screen to display information related to the execution pattern.

12. A method for controlling a mobile terminal, the method comprising:
setting a first setting of the mobile terminal;
collecting status information of the mobile terminal when an application is executed;
generating an execution pattern of at least one application by using the collected status information, the execution pattern used to control when the at least one application is executed;
select a first application from the at least one application, the first application being an application to be executed based on the execution pattern;
changing the first setting to a second setting based on the execution pattern, the second setting related to execution of the first application;
maintaining the second setting if the first application is executed according to the second setting; and
changing the second setting back to the first setting if the first application is not executed according to the second setting within a predetermined period of time.

13. A mobile terminal comprising:
a touch screen configured to display information and receive a user input;
a memory configured to store an execution pattern of at least one application, the execution pattern used to control when the at least one application is executed; and
a controller configured to:
identify an application of the at least one application according to the execution pattern, the application frequently executed at a specific time;
change a setting related to execution of the identified application from a first setting to a second setting before the specific time
receive content related to the identified application before the specific time;
maintain the second setting if the identified application is executed according to the second setting; and
change the setting from the second setting back to the first setting if the identified application is not executed according to the second setting within a predetermined period of time.

14. The mobile terminal of claim 13, wherein the controller is further configured to:
collect status information of the mobile terminal; and
generate the execution pattern based on the collected status information when the at least one application is executed.

15. The mobile terminal of claim 13, wherein the first or second setting includes at least a screen display setting, an audio output setting, or a wireless communication setting.

* * * * *